(12) United States Patent
Bradley

(10) Patent No.: US 6,588,267 B1
(45) Date of Patent: Jul. 8, 2003

(54) ISOLATOR BAR FOR ACOUSTIC INSTRUMENTS USED IN DOWNHOLE FORMATIONS

(75) Inventor: Richard W. Bradley, Pampa, TX (US)

(73) Assignee: Titan Specialties, Ltd., Pampas, TX (US)

( * ) Notice: Subject to any disclaimer, the term of this patent is extended or adjusted under 35 U.S.C. 154(b) by 0 days.

(21) Appl. No.: 10/096,462

(22) Filed: Mar. 12, 2002

(51) Int. Cl.$^7$ ................................................. G01V 1/40
(52) U.S. Cl. ..................... 73/152.47; 181/102; 181/106
(58) Field of Search ................................ 181/102, 196, 181/106; 73/617, 152.47, 152.58

(56) References Cited

U.S. PATENT DOCUMENTS

| | | | | |
|---|---|---|---|---|
| 4,040,003 A | * | 8/1977 | Beynet et al. ................. | 367/84 |
| 4,850,450 A | * | 7/1989 | Hoyle et al. .................. | 181/102 |
| 4,951,267 A | * | 8/1990 | Chang et al. .................. | 367/31 |
| 5,070,533 A | * | 12/1991 | Bridges et al. ............... | 392/301 |
| 5,229,553 A | * | 7/1993 | Lester et al. ................. | 181/102 |
| 5,510,582 A | * | 4/1996 | Birchak et al. ............. | 181/102 |
| 6,173,606 B1 | | 1/2001 | Mosley ..................... | 73/152.16 |
| 6,494,288 B1 | * | 12/2002 | Tashiro et al. ............... | 181/102 |
| 2003/0024761 A1 | * | 2/2003 | Tashiro et al. ............... | 181/105 |

* cited by examiner

Primary Examiner—Hezron Williams
Assistant Examiner—Rose M. Miller
(74) Attorney, Agent, or Firm—Gabor L. Szekeres

(57) ABSTRACT

An isolator bar of acoustic instruments used in downhole applications is made of a substantially cylindrical tube of metal of the type from which downhole instrument housing is usually made. A plurality of slots are placed in the tube at angles which are between 10 to 80° angle relative to the longitudinal axis of the tube. The isolator bar is equipped with traditional mechanical means with which it is incorporated in the acoustic instrument, placed between an acoustic transducer and an acoustic sensor or sensors utilized in the instrument. The angled slots cause sound waves traveling through the isolator bar to travel through multiple and extended path to the acoustic sensor, without significantly weakening the structural strength of the isolator bar.

29 Claims, 5 Drawing Sheets

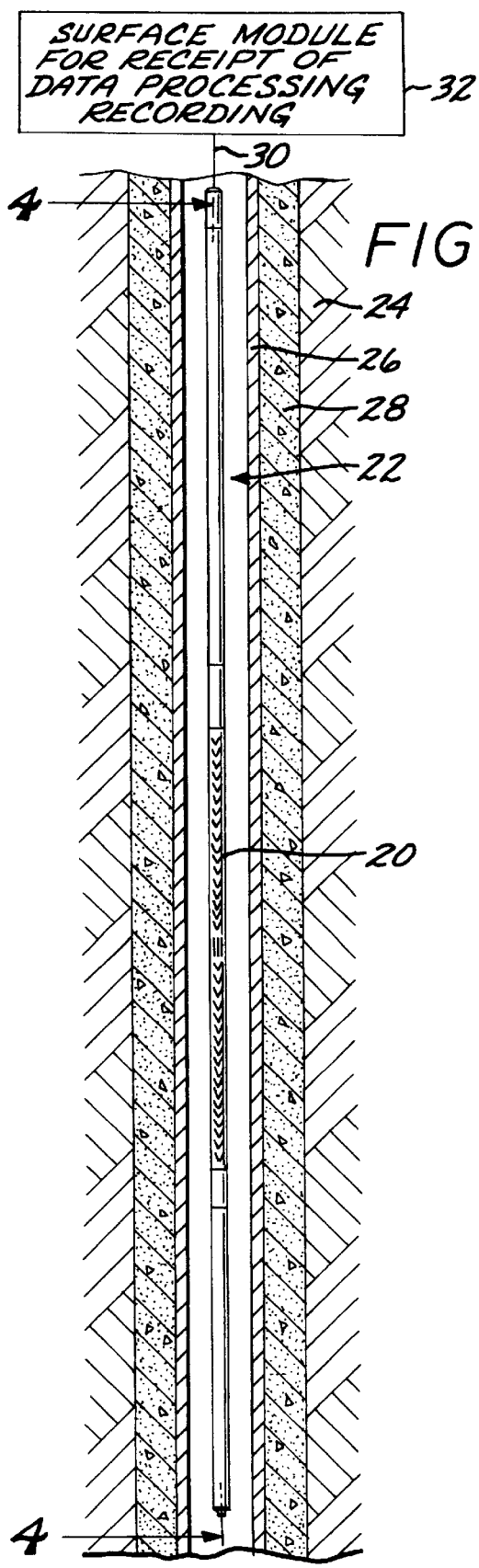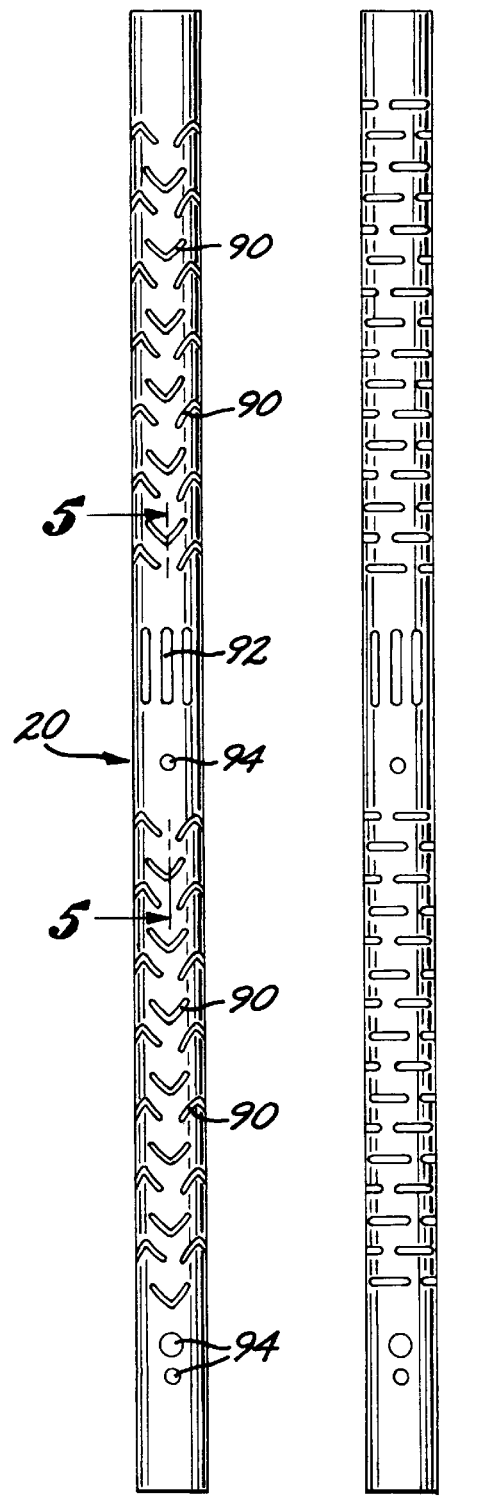
FIG.1
FIG.2   FIG.3
PRIOR ART

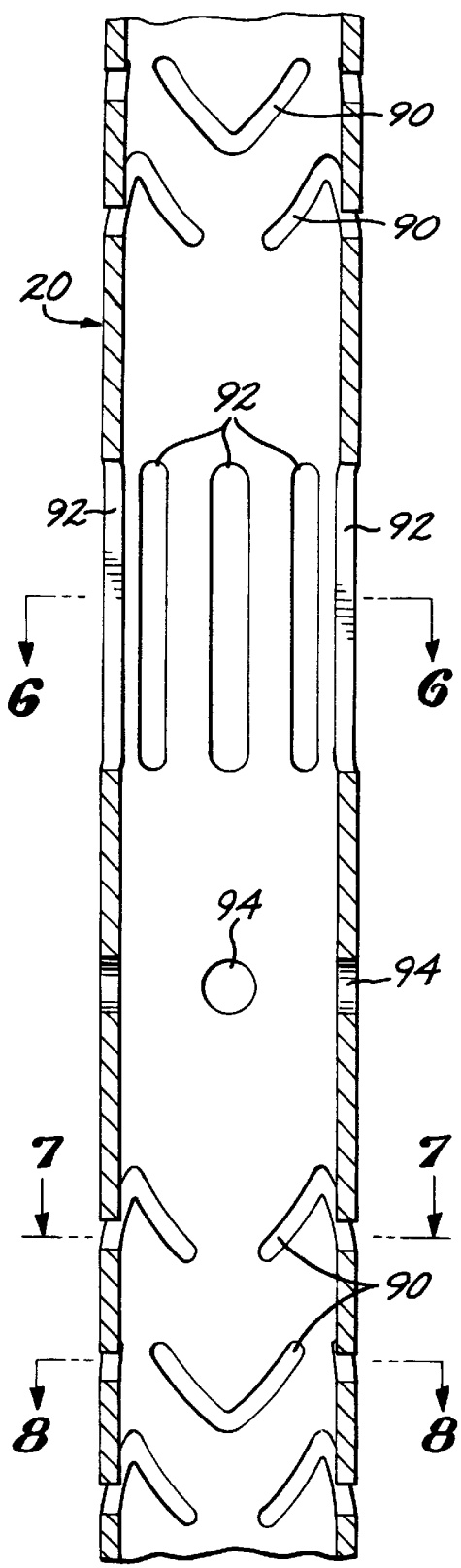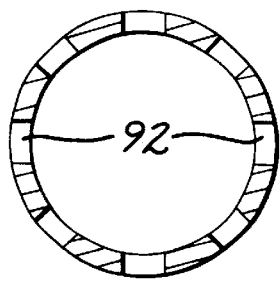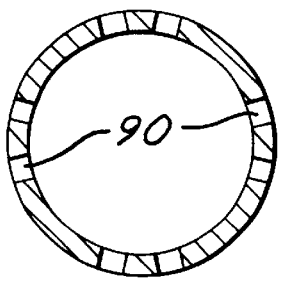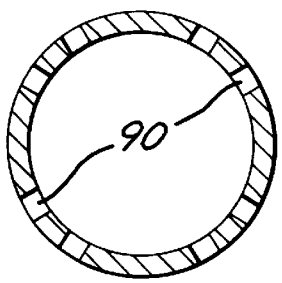

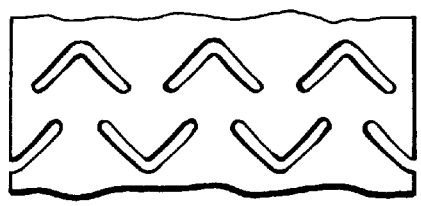
FIG. 9
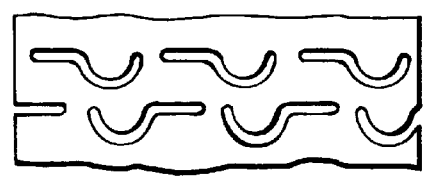
FIG. 10
FIG. 11
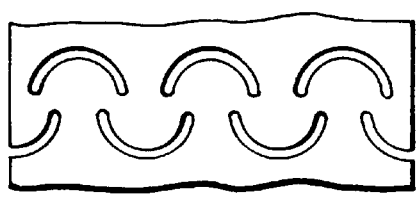
FIG. 12
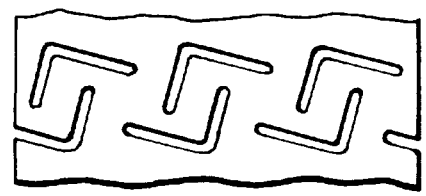
FIG. 13
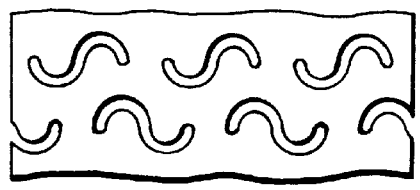
FIG. 14
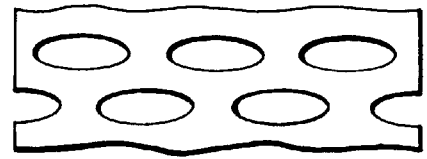
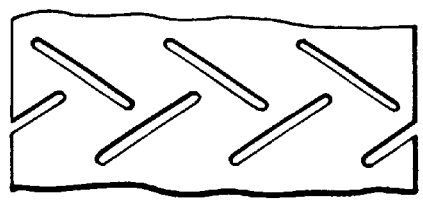
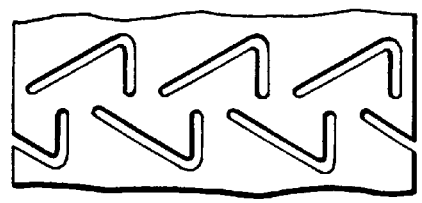
FIG. 15
FIG. 16

ISOLATOR BAR FOR ACOUSTIC INSTRUMENTS USED IN DOWNHOLE FORMATIONS

BACKGROUND OF THE INVENTION

1. Field of the Invention

The present invention is in the field of instruments used in connections with explorations or production of oil, gas, steam or other minerals in or from downhole formations. More particularly, the present invention is in the field of acoustic instruments used in connection with such downhole work. Still more particularly, the present invention relates to a sound isolator bar or component of acoustic instruments used in such downhole work.

2. Brief Description of the Prior Art

Several instruments utilized in downhole formation evaluation operate on acoustic principles. In essence, such instruments include a sound emitting transducer and one or more sound sensors positioned at predetermined distances from the transducer. Sound or acoustic waves emitted by the transducer travel through several media to the sensor or sensors. These media include any water, drilling mud or other liquid that surrounds the acoustic instrument in the downhole location and through any pipe, pipe casing and possible cement bonding around the casing, through the earth formation, and through the instrument itself. In order to obtain useful information for example about the cement bonding around the pipe casing, or the formation itself, it is necessary for the sensors to distinguish among the sound signals which have reached the sensor or sensors after having traveled through the several above-mentioned media. This is usually possible because sound travels at different speeds in different media. Nevertheless it was found in practice to be difficult to distinguish between sound waves that have traveled through the instrument housing itself and through metal, such as pipe casing, that surrounds the instrument. It is well understood in the art that sound that has traveled through the instrument housing itself carries no useful information about any media surrounding the instrument itself.

An important example of the use of acoustic instruments is in the field of logging instruments for evaluation of cement bonding to pipe casings in downhole formations. As is known in the art, a pipe casing in a downhole formation utilized for the production of oil, gas, steam, or other minerals is typically surrounded by a layer of cement that ideally should be tightly bonded to the metal casing. The integrity of the bond between the metal casing is of such importance that acoustic instruments have been developed in the art to measure the integrity or quality of the casing-metal-to-cement bond and to create a "log" of the corresponding data along the length of the pipe casing. More particularly, the acoustic instrument utilized for this cement logging purpose includes a sound emitting transducer and a plurality (usually two) sound sensors positioned at predetermined distances (usually at 3 and 5 feet) above the transducer. The instrument is lowered into the borehole on a wireline, centered within the casing by means that are usual for centering downhole instruments in a pipe and the transducer is activated by electrical energy supplied to it through the wireline. Sound waves (acoustic energy) generated by the transducer travel through several paths to the two sensors located in the instrument above the transducers. One eminent path of the sounds is through the liquid (water or drilling mud) that usually fills the pipe casing at this stage of the downhole operation or exploration, another paths is through the metal casing, still another through the formation, and yet another through the body of the instrument itself. The basic principle behind using acoustic energy to collect data on the integrity of cement bonding to the casing is that cement bonded tightly to the metal casing significantly attenuates the sound energy that is conducted through the pipe, much the same as a steel tube held tightly in a vise "rings" significantly less when struck by a hammer than a free standing steel tube. Thus, it is important for the instrumentation that receives data from the sensors to identify the acoustic energy that reaches the sensor(s) through the casing, and distinguish it from acoustic energy that has traveled to the sensor(s) through other routes.

Generally speaking sound waves (acoustic energy) travel through aqueous fluid at the speed of approximately 180 to 220 $\mu$sec/foot, through steel at approximately 57 $\mu$sec/foot and in the formation at the speed of approximately 45 to 200 $\mu$sec/foot. Based on these different speeds an instrument that receives input from the sensors that measure the timing of the sound waves' arrival as well as their intensity (amplitude) can usually differentiate on the basis of the timing of their arrivals (and other factors) among the sound waves that have traveled from the transducer to the sensor(s) through the liquid inside the casing, the steel pipe and the formation. However, as it was noted above, in this cement logging and also in other uses of acoustic instruments in downhole formations, the sound waves traveling through the metal body of the instrument itself are difficult to distinguish from the sound waves (acoustic energy) that reaches the sensor(s) through the metal casing. Moreover, in this cement logging application as well as in other downhole applications, the acoustic energy transmitted through the body of the instrument carries no useful information regarding the formation nor about the integrity of the cement bonding to the casing.

The prior art has coped with the just-described problem in various ways. One method of solution utilized in the prior art is to place a lead-filled pipe section as part of the body of the instrument, that is separating the sound emitting transducer of the instrument from the sensors by a lead-filled pipe section that acts as an "isolator bar". An important improvement over this method, still using a lead bonded steel tube as an isolator bar is described in U.S. Pat. No. 6,173,606. However, perhaps the longest known and still most frequently used way to prevent acoustic energy that has traveled through the instrument housing from interfering with acoustic energy that has traveled through other media (such as the pipe casing or the formation) is to provide an isolator bar that comprises a highly slotted steel body. Sound waves traveling through the highly slotted steel body must travel through multiple and extended paths whereby they arrive later than they would through an ordinary pipe section, and tend to cancel each other due to interference. This phenomenon or result is sometimes referred to as "isolating" or "attenuating" sound that has traveled through the instrument.

FIG. 3 of the appended drawings of this application shows an isolator bar of the prior art which includes a plurality of slots in its body. As is illustrated in this drawing, the isolator bars of the prior art for the purpose of attenuating sound traveling through the instrument body have always included slots which were perpendicular to (at 90° angle) to the longitudinal axis of the instrument itself. In an isolator bar which is disposed in a nominally vertical position these slots appear horizontal, as shown in FIG. 3. The effect of these prior art slots on the structural strength of the isolator bars of the prior art must be understood in the context that an isolator bar typically is of several feet in length and has a relatively small diameter because it is part of an instrument that must fit within a pipe or in a borehole in a formation. The range of diameter of such instruments, including the isolator bar, is between 0.75 to 12 inches, with instruments being between 1 to 3 inches in diameter being more typical. It can be readily seen, and experience has shown that isolator bars with slots which are perpendicular to the longitudinal axis of a pipe of several feet in length and have the above-noted diameters are significantly weakened, particularly against bending forces. This is a serious disadvantage of the slotted sound isolator bars of the prior art. The present invention provides a slotted isolator bar that eliminates or significantly reduces the problem of structural weakening caused by the slots placed in the bar in accordance with the prior art.

OBJECTS AND SUMMARY OF THE INVENTION

It is an objective of the present invention to provide a slotted isolator bar used in conjunction with acoustic instruments in downhole formations, where the structural integrity and resistance of the isolator bar against bending forces is not significantly weakened.

It is another objective of the present invention to provide an acoustic logging instrument which has an isolator bar that meets the first above-noted objective.

It is still another objective of the present invention to provide an acoustic logging instrument in combination with a γ-ray tool, the combination including an isolator bar that meets the first above-noted objective.

The foregoing and other objectives and advantages are attained by an isolator bar which comprises a substantially cylindrical tube of metal of the type from which downhole instrument housing is usually made. A plurality of slots are placed in the tube at angles which are between 10 to 80° angle relative to the longitudinal axis of the tube. The isolator bar is equipped with traditional mechanical means with which it is incorporated in an instrument, placed between an acoustic transducer and an acoustic sensor or sensors utilized in the instrument. The angled slots cause sound waves traveling through the isolator bar to travel through multiple and extended path to the acoustic sensor, without significantly weakening the structural strength of the isolator bar.

The features of the present invention can be best understood together with further objectives and advantages by reference to the following description, taken in connection with the accompanying drawings, wherein like numerals indicate like parts.

BRIEF DESCRIPTION OF THE DRAWINGS

FIG. 1 is an overall schematic view of a combination acoustic logging instrument and γ-ray detector which incorporates a preferred embodiment of the isolator bar of the present invention, the figure showing the combination in a downhole formation.

FIG. 2 is a plan view of the preferred embodiment of the isolator bar of the present invention.

FIG. 3 is an isolator bar in accordance with the prior art.

FIG. 5 is an enlarged, partial cross-sectional view of the preferred embodiment of the isolator bar, the cross section being taken on lines 5,5 of FIG. 2.

FIG. 6 is a cross-sectional view taken on lines 6,6 of FIG. 5.

FIG. 7 is a cross-sectional view taken on lines 7,7 of FIG. 5.

FIG. 8 is a cross-sectional view taken on lines 8,8 of FIG. 5.

FIG. 9 is a partial plan view showing a second preferred embodiment of the isolator bar of the present invention.

FIGS. 10 through 16 are further partial plan views showing still alternative preferred embodiments of the isolator bar of the present invention.

DETAILED DESCRIPTION OF THE PREFERRED EMBODIMENTS

Figure 4:
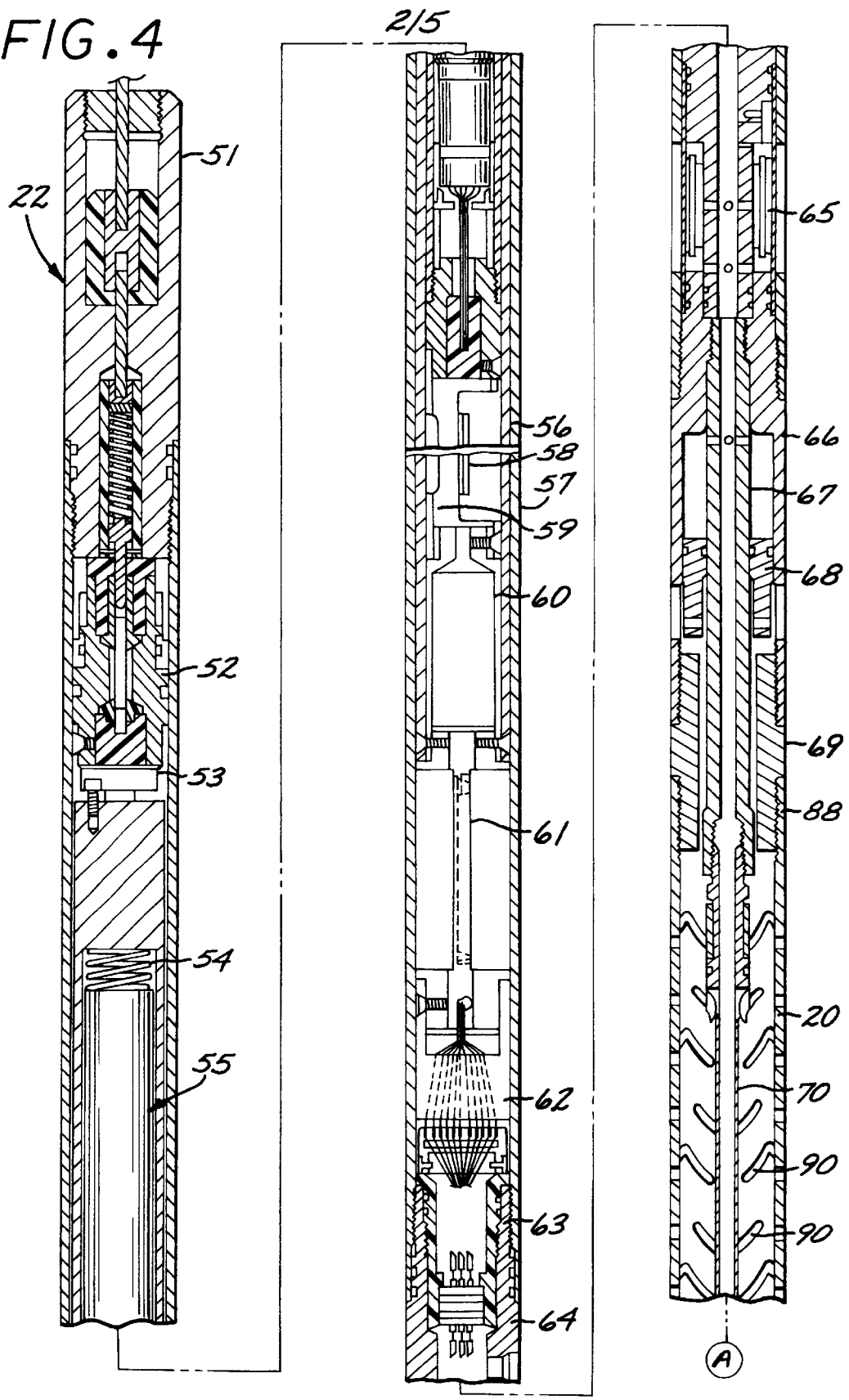
FIG. 4 is a cross-sectional view of the combination acoustic logging instrument and γ-ray detector which incorporates the preferred embodiment of the isolator bar of the present invention, the cross-section being taken on lines 4,4 of FIG. 1.
Figure 4:
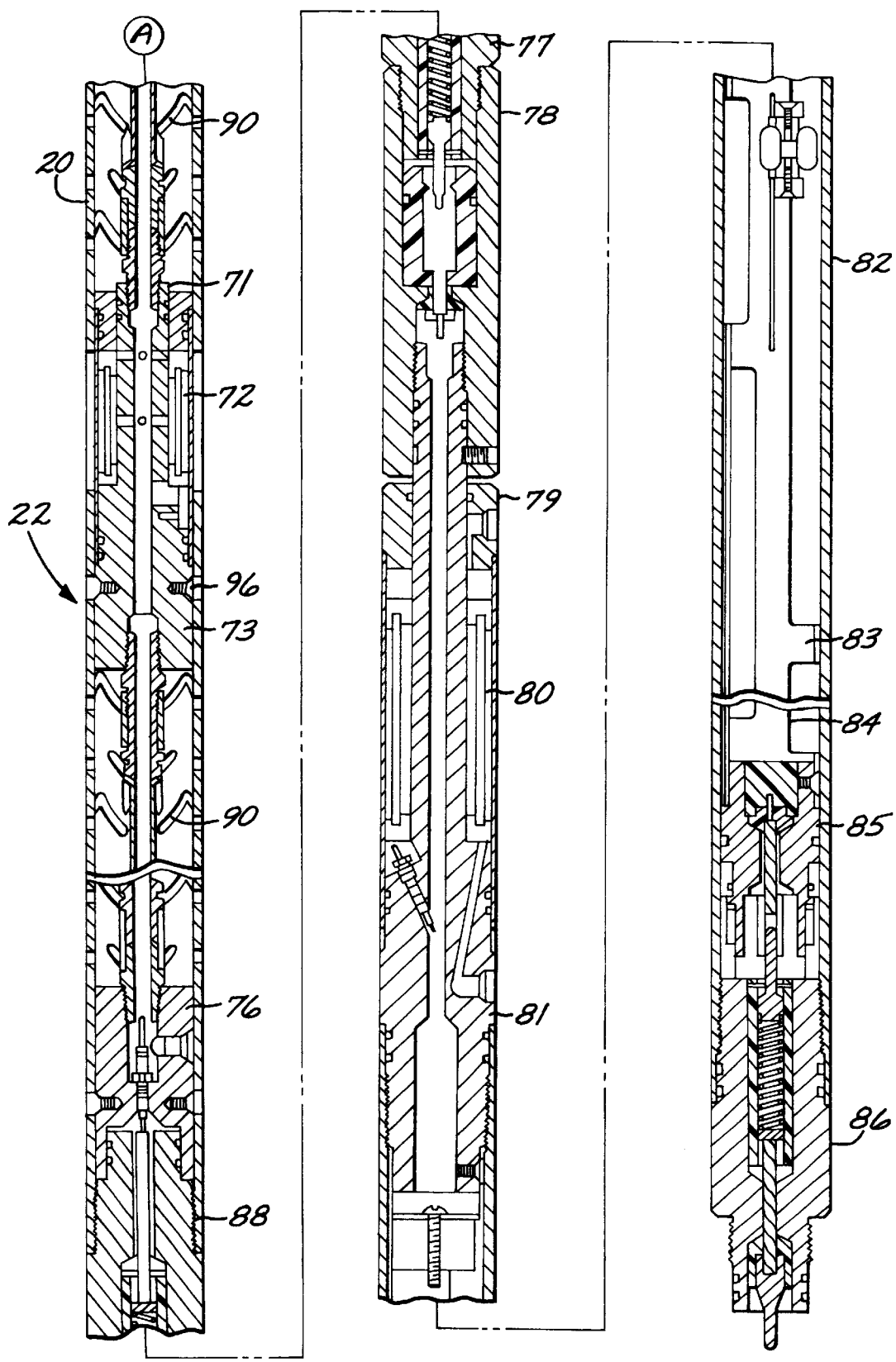

The following specification taken in conjunction with the drawings sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Referring now to the drawing figures, a first preferred embodiment of the isolator bar 20 of the present invention is shown in FIG. 2, while FIG. 1 shows the isolator bar incorporated in a combination acoustic logging instrument and γ-ray detector 22 in the environment in which the isolator bar 20 and the combination instrument 22 are normally used.

Although present invention relates to the isolator bar 20 itself, nevertheless its use is best explained by brief descriptions of the above-noted combination acoustic logging instrument and γ-ray tool 22, and of the environment in which this combination instrument, or of other downhole acoustic instruments are normally used.

As it was noted in the introductory section of the present application for patent, acoustic instruments are used for obtaining information (data) from a borehole made in a formation 24 in connection with exploration for or production of oil, gas, steam or other minerals. The borehole is usually equipped with a casing 26 that comprises a plurality of steel tube sections threaded to one another and placed into the borehole. For production of oil, gas, or steam the casing is surrounded by a layer of cement 28 that is bonded to the casing 26. One, but certainly not the only one, important use of the isolator bar 20 of the present invention is in an acoustic logging instrument which measures and logs information pertaining to the tightness of the bonding of the cement 28 to the pipe casing 26. Moreover, such acoustic logging instruments are often combined with conventional γ-ray tools. Thus, FIGS. 1 and 4 disclose an otherwise conventional logging instrument and γ-ray tool combination incorporating as its principal novel feature the isolator bar 20 of the present invention. However, it should be understood that the isolator bar 20 of the present invention can be advantageously incorporated between one or more sound transducers and transmitters and one or more acoustic censors, respectively in all other types of acoustic instrument. Examples for such other instruments are acoustic stuck-pipe logging instrument, velocity open hole logging tool, compensated acoustic logging tool and long spaced acoustic logging tool. Moreover, the herein described exemplary acoustic logging instrument and γ-ray tool combination 22 which incorporates the isolator bar 20 of the present invention can be used for purposes other than measuring and logging cement bonding, for example in open holes in formations.

Inasmuch as components of the acoustic logging instrument, of the γ-ray tool and associated equipment other than the isolator bar 20 of the present invention are conventional, the conventional parts or components are identified and described here only to the extent necessary to describe the present invention. Thus, referring now primarily to FIGS. 1 and 4 the combined acoustic logging instrument or tool and γ-ray tool 22 are held in the casing 26, and prevented from falling in further by a wireline 30 that includes an electrical cable connecting the instrument with equipment on the surface. The equipment on the surface is schematically shown in FIG. 1 as a "surface module" 32. Those skilled in the art should understand that the term "surface module" in the description of the present invention includes electronic and associated equipment that receives data from sensors in the acoustic logging instrument or tool and preferably from γ-ray tool as well, processes the data in accordance with predefined algorithms, displays and optionally stores the data as well. The display of the data usually takes the form of a logging chart that is well known by those skilled in the trade. It will also be understood by those skilled in the art, that processing, storing and displaying the data on a computer screen, by printing a log or chart or otherwise, do not need to occur at a site in the close proximity of the borehole, and can occur at a remote location. The instruments and algorithms used for processing the data obtained from the acoustic logging tool and also from the γ-ray tool per se are known in the art, and need not be described here.

Referring now primarily to the cross-sectional view of FIG. 4, the components of the combination acoustic logging instrument and γ-ray detector 22 are identified by the names usually applied to the components in the trade. However, because the novel aspect of this instrument 22 is in the isolator bar 20, the conventional components are not described in detail. The drawing figures also do not show a top centralizer above the instrument 22 and a bottom centralizer below the instrument 22. These components are not shown because they are well known in the art.

Thus, beginning identification of the components at the top of the instrument shown in FIG. 4, as the instrument would normally be placed in the casing 26 in the borehole, it includes a top sub-assembly 51 that is electrically connected to and is supplied with power from the surface through the wireline 30. Following below the top centralizer (not shown) and the top sub-assembly 51 the parts are an adapter header 52, an upper end header 53, a compression spring 54, and a γ-ray detector assembly 55. Below the γ-ray detector assembly 55 is a vacuum flask 56, mounted in a housing 57 containing a pc board assembly 58 and pc board chassis 59. Below the pc board chassis 59 are located a bottom heat insulator 60, a component chassis 61 and a multi-contact pin assembly 62, which represents the lower end of the γ-ray portion of the instrument 22. Mounted below the multi-contact pin assembly 62 is the receiver section of the instrument, designed to receive the acoustic energy which is transmitted from further below from a transmitter section. The receiver section begins with the multi-contact block assembly 63 mounted to a receiver mandrel 64 that incorporates a "5 foot" receiver crystal 65. The "5 foot" receiver crystal 65 has that name because it is located at 5 feet distance from the acoustic transmitter mounted below. Mounted to the receiver mandrel 64 and below the 5 foot receiver crystal 65 is a pressure compensator subassembly 66, including a compensator mandrel 67, compensator piston 68 and compensator tandem 69. The isolator bar 20 is attached by threads below the compensator mandrel 67. Because the isolator bar 20 is the principal novel feature of the herein illustrated combination acoustic logging instrument and γ-ray detector 22 it is described in more detail below.

A steel braided coiled tubing (metal) assembly 70 is located inside the isolator bar 20 to contain and protect wires providing electrical power to the instruments or parts located in the isolator bar 20 and still further below. Still within the isolator bar 20 is mounted a receiver end plug 71, and a "3 foot" receiver crystal 72. The "3 foot" receiver crystal 72 is located at a distance of 3 feet from the acoustic transmitter mounted below and is actually contained in a receiver mandrel 73 that is itself mounted into the isolator bar 20 which continues below. A feed through adapter 76 is mounted into the isolator bar 20 close to its lower end which is attached by threads to a bottom adapter subassembly 77.

The bottom adapter subassembly 77 connects the above-identified acoustic receiver section of the instrument 22 to the transmitter section located below. The transmitter section includes a transmitter mandrel adapter 78, transmitter can 79, transmitter assembly 80, transmitter mandrel 81, and a lower housing 82 that includes in its interior a chassis tube 83 and pc board assembly 84. A contact header assembly 85 is mounted inside the lower housing 82 and a bottom sub assembly 86 is attached by threads to the lower end of the lower housing 82, thereby terminating the transmitter section. However, below the transmitter section is the bottom centralizer which is not shown because it is state-of-the-art.

Although the above identified components and their functions, except for the novel isolator bar 20, are known in the art and need not be described in detail, for a more detailed description of these parts and of their functions reference is nevertheless made to U.S. Pat. No. 6,173,606, the descriptive portion of which is incorporated herein as if it were described verbatim. It is considered sufficient to note that the acoustic energy dispersed by a transducer in the transmitter assembly 80 is isolated from the 3 foot receiver crystal 72 and from the 5 foot receiver crystal 65 by the novel isolator bar 20 of the invention in such a manner that the acoustic energy received by the sensors (represented by the crystals 65 and 72) is minimized due to interference and can be readily distinguished from the acoustic energy that has traveled to the sensors through media located outside the instrument 22 itself.

Focusing now on the isolator bar 20, shown in more detail in FIGS. 2 and 5 through 8, it is formed in the shape of a hollow cylindrical body or tube. It can be made of any metal or metal alloy which is suitable for use in a borehole or downhole environment. Examples for such metals or alloys are stainless steel, carbon steel, beryllium copper, titanium, and various nickel alloys. Examples for stainless steel suitable for the application are any heat treated version of 17-4 stainless, 300 series stainless, and 1018-1026 mild steel. Examples for the nickel alloys suitable for the application are the alloys known under the trade name MONEL™ and INCONEL™. The presently preferred embodiment of the isolator bar 20 is made of 4130 cold drawn alloy steel.

The length of the isolator bar 20 of the invention tends to be in the same range as the length of slotted isolator bars of the prior art. As this will be readily understood by those skilled in the art, the length of isolator bars in acoustic instruments depends on the nature and application of the instrument itself. Generally speaking and considering all types of acoustic instruments the isolator bar 20 of the invention is in the range of approximately 1 foot to approximately 20 feet. It should be understood in this regard that the length of the isolator bar 20 is not critical, as long as it serves the intended purpose of substantially attenuating (due to interference) the intensity of acoustic energy that reaches the sensor or sensors of an acoustic instrument through the instrument body itself, and further the purpose of providing an extended route for the acoustic energy to travel from the transducer to the sensor or sensors whereby the sensor or sensors can distinguish this acoustic signal from other acoustic signals that reach the sensor or sensors through other media. The herein shown first preferred embodiment of the isolator bar 20 is 41 inches long and this length serves well in a typical combination γ ray and cement logging acoustic instrument having "3 feet" and "5 feet" sensors, described and shown above.

In order to enable the mounting of the isolator bar 20 between the sensor or sensors and transducer of the acoustic instrument in which the isolator bar 20 is used, the ends of the isolator bar 20 include internal threads 88 which are shown in FIG. 4. Instead of the internal threads 88 other mechanical means (such as flanges and bolts) normally used in assembling parts of downhole instruments could also be used in the isolator bar 20 of the invention.

As is known, drill pipes and well casings vary in diameter. Accordingly, instruments which are used in downhole or borehole locations also vary in diameter. For this reason the isolator bar 20 of the present invention which is constructed to be a part of an instrument used in downhole or borehole applications also vary in diameter between approximately 0.75 inch to approximately 12 inches. A more typical range of outer diameter of the isolator bar 20 of the invention is between approximately 1 to 3 inches, and the herein described first preferred embodiment of the isolator bar 20 has an outer diameter of 1.688 inches and an inner diameter of 1.437 inches.

The principal novel aspect of the isolator bar 20 of the present invention is that a plurality of slots 90 are provided in the bar 20 itself, which slots 90 are neither parallel (0°) with the longitudinal axis of the bar 20, nor are perpendicular (90°) to the longitudinal axis of the bar 20. As noted above, the purpose of the slots 90 is to enable the sensor or sensors in the acoustic instrument to distinguish between acoustic energy that has traveled through the instrument body and other media. The purpose of providing the slots at an angle other than perpendicular to the longitudinal axis of the bar 20 is to substantially maintain or conserve the structural integrity of the bar 20 and thereby conserve its resistance against bending forces.

It was found in accordance with the present invention that the above-noted purposes are served when the slots 90 are angled between 10 to 80° relative to the longitudinal axis of the bar 20, more preferably between 35 to 50° relative to the longitudinal axis, and most preferably between 40 to 50° relative to the longitudinal axis. The amount of material which is removed or "cut away" from the isolator bar to form the slots depends on the degree or extent of the sound attenuation which is desired, and also on the configuration of the slots, as some configurations weaken the bar more than some others. Generally speaking, a maximum of approximately 40 percent of the material of the isolator bar 20 may be removed or "cut away" in the form of the slots 90 and still have a bar 20 of sufficient structural strength. A minimum of approximately 10 percent of the material of the bar 20 needs to be removed in order to obtain sufficient attenuation of the acoustic energy that travels through the bar 20 lengthwise. The amount of material to be removed is more preferably in the range of 12 to 20 percent of the material of the isolator bar 20, and in the herein described first preferred embodiment it is 14.35 percent.

The slots 90 of the first preferred embodiment are substantially "V" shaped, and thus are comprised of a combination of substantially straight lines. The width of such straight-line but nevertheless angled slots 90 may range between approximately 0.005 inches to approximately 1.00 inch, depending on the diameter of the isolator bar 20. When the isolator bar 20 has an outer diameter of approximately 2 inches, then the width of the angled slots 90 is typically and preferably between approximately 0.1 to 0.25 inches. When the outer diameter of the isolator bar 20 is approximately 3 inches then the width of the angled slots 90 is typically and preferably approximately 0.375 inches.

FIGS. 2 and 4 show that the angled slots 90 are positioned throughout the length of the isolator bar 20 beginning slightly above and below the respective threaded portions or threads 88. In alternative embodiments wherein the isolator bar 20 has no internal threads because it is coupled to the rest of the instrument by alternative means (such as flanges and bolts) the slots 90 may be positioned virtually throughout the entire length of the isolator bar 20. However, providing angled slots 90 throughout the entire length of the bar 20, or even within the entire length between the threaded portions is not essential. What is important is to provide sufficient angled slots 90 to serve the purpose of attenuating and lengthening the route of travel of the acoustic energy through the bar 20 to the acoustic sensor or sensors, as described above. The drawing figures also disclose elongated slots 92 which are substantially parallel with the longitudinal axis of the isolator bar 20 and are disposed substantially in the middle of the isolator bar 20. These slots 92 are in accordance with the state of the art and are at the location where the 3 foot receiver crystal 72 is located within the bar 20. The purpose of the slots 92 is to enable the crystal 72 to receive sound signals which have traveled through media other than the instrument itself and which reach the sensor crystal 72 directly without having to go through the metallic isolator bar 20. Round holes 94 in the isolator bar 20 are present to enable the placement of bolts 96 (shown in FIG. 4) or like fastening devices, which affix certain components, such as the receiver mandrel 73, in the isolator bar 20.

Whereas it is an important feature of the present invention that a substantial portion of the slots 90 designed to attenuate and delay the sound signal traveling through the bar 20 be angled relative to the longitudinal axis of the bar 20, these slots do not need to be formed of straight lines. They can be circles, or curvilinear in a multitude of forms, and can also be formed of a combination of curved lines with straight lines. FIGS. 9 through 16 disclose alternative embodiments of the isolator bar of the invention having entirely curvilinear (FIGS. 11 and 13) circular (FIG. 14) and other alternative arrangement of angled slots (FIGS. 9, 10, 12, 15 and 16.) A combination of these and other angled slots is also within the scope of the present invention. It should be understood in this connection that a slot which is circular or formed of curved lines is considered angled relative to the longitudinal axis of the bar 20. In fact when applying, basic geometrical principles, the angle of a curved line relative to a reference line is the angle of the tangent of the curve at any given point. In this geometrical sense also, the curved or circular slots of the invention are at an angle relative to the longitudinal axis of the isolator bar 20.

As proven by the below described comparative test a principal advantage of providing the angled slots in the isolator bar of the present invention is that the angled slots do not significantly diminish the structural strength of the isolator bar.

The isolator bar which had angled slots as shown for the first preferred embodiment, having outer diameter of 1¹¹⁄₁₆ inches and comprising 4130 heat treated steel of 34 to 39 Rockwell hardness was supported in a horizontal position substantially at two ends of the bar, namely at points 42 inches apart on the bar. A 500 pound downward force was applied in the middle and the downward deflection at the center of the bar was measured. Exactly the same test was performed in a prior art isolator bar, made of the same material and having exactly the same dimensions, except that the prior art bar had slots in accordance with the prior art which are perpendicular to the longitudinal axis of the bar. The deflection of the bar of the invention under the 500 lb force was only 0.4 inches, whereas the deflection of the prior art bar was 1.491 inches.

It should be understood that it is also possible in accordance with the present invention to combine prior art perpendicular (90°) slots with the angled slots of the present invention. However, the prior art slots structurally weaken the isolator bar, and for this reason it is preferred that at least a substantial part (at least approximately 25 per cent) of the slots placed in the bar to attenuate and delay acoustic energy should be in accordance with the present invention. It is even more preferred that a majority of the slots be in accordance with the present invention, and it is most preferred that perpendicular slots (90°) of the prior art be avoided altogether in the isolator bars of the invention.

The slots in accordance with the invention can be formed (machined) into the tubular body of the isolator bar in accordance with several techniques known in the art. These include the use of milling machines, water jet, plasma cutter machines, flame cut or torch, and laser cutter machines, such as YAG laser and $CO_2$ laser.

What is claimed is:

1. An isolator bar to be incorporated in an acoustic instrument for use in downhole applications, the isolator bar comprising:
    an elongated tubular metal body having a longitudinal axis and a plurality of slots in the body, the slots being disposed at an angle which is between ten and eighty degrees (10° to 80°) relative to the longitudinal axis, said angled slots causing sound waves traveling through the isolator bar to travel through multiple and extended paths to an acoustic sensor without significantly weakening the structural strength of the isolator bar.

2. An isolator bar in accordance with claim 1 wherein the slots are disposed at an angle which is between thirty five to fifty degrees (35 to 50°) relative to the longitudinal axis.

3. An isolator bar in accordance with claim 1 wherein the slots are disposed at an angle which is between forty to fifty degrees (40 to 50°) relative to the longitudinal axis.

4. An isolator bar in accordance with claim 1 wherein the slots disposed in said range of angles would represent less than approximately forty percent (40%) of the material of the tubular metal body if said body were without the slots.

5. An isolator bar in accordance with claim 1 wherein the slots disposed in said range of angles would represent approximately twelve to twenty percent (12 to 20%) of the material of the tubular metal body if said body were without the slots.

6. An isolator bar in accordance with claim 1 wherein the tubular body has an outer diameter in the range of approximately 0.75 to approximately 12.0 inches.

7. An isolator bar in accordance with claim 1 which is approximately 1 foot to 20 feet long.

8. An isolator bar in accordance with claim 1 having first and second ends and further comprising mechanical means to connect said first and second ends to the acoustic instrument, said instrument having at least one acoustic transmitter and at least one acoustic sensor, the isolator bar to be connected between said transmitter and sensor.

9. An isolator bar to be incorporated in an acoustic instrument for use in downhole applications, the instrument having at least one acoustic transmitter and at least one acoustic sensor, the isolator bar to be connected between said transmitter and sensor, the isolator bar comprising:
    an elongated tubular metal body having a first end and a second end, a longitudinal axis and means formed in said metal body for lengthening the path of and attenuating acoustic energy that travels lengthwise through the tubular body, said means comprising a plurality of slots in the body, the slots being disposed at an angle which is between ten to eighty degrees (10 to 80°) relative to the longitudinal axis, whereby acoustic energy from the transmitter that reaches the sensor through the elongated tubular body is substantially attenuated due to interference caused by multiple paths of said energy through the slotted tubular body and whereby the structural strength of the tubular body is substantially maintained in spite of the presence of the slots.

10. An isolator bar in accordance with claim 9 further comprising mechanical means for connecting the first and second ends of the isolator bar to the instrument between said transmitter and sensor.

11. An isolator bar in accordance with claim 10 wherein the slots are disposed at an angle which is between thirty five to fifty degrees (35 to 50°) relative to the longitudinal axis.

12. An isolator bar in accordance with claim 10 wherein the slots are disposed at an angle which is between forty to fifty degrees (40 to 50°) relative to the longitudinal axis.

13. An isolator bar in accordance with claim 10 wherein the slots disposed in said range of angles would represent less than approximately forty percent (40%) of the material of the tubular metal body if said body were without the slots.

14. An isolator bar in accordance with claim 10 wherein the slots disposed in said range of angles would represent approximately twelve to twenty percent (12 to 20%) of the material of the tubular metal body if said body were without the slots.

15. An isolator bar in accordance with claim 10 wherein the tubular body has an outer diameter in the range of approximately 0.75 to approximately 12.0 inches.

16. An isolator bar in accordance with claim 10 wherein the slots are formed of substantially straight lines.

17. An isolator bar in accordance with claim 10 wherein the slots comprise substantially V-shaped cuts in the tubular body.

18. An isolator bar in accordance with claim 10 wherein the slots are formed of substantially curved lines.

19. An acoustic instrument for use in downhole applications, the instrument comprising:
    at least one acoustic transmitter;
    at least one acoustic sensor;
    an elongated tubular housing in which said transmitter and sensor are mounted, and
    an isolator bar to be connected to the housing between said transmitter and sensor, the isolator bar comprising an elongated tubular metal body having a longitudinal axis and means formed in said metal body for lengthening the path of and attenuating acoustic energy that travels lengthwise through the tubular body, said means comprising a plurality of slots in the body, the slots being disposed at an angle which is between ten to eighty degrees (10 to 80°) relative to the longitudinal axis, whereby acoustic energy from the transmitter that reaches the sensor through the elongated tubular body is substantially attenuated due to interference caused by multiple paths of said energy through the slotted tubular body and whereby the structural strength of the tubular body is substantially maintained in spite of the presence of the slots.

20. An acoustic instrument in accordance with claim 19 wherein the slots of the isolator bar are disposed at an angle which is between thirty five to fifty degrees (35 to 50°) relative to the longitudinal axis.

21. An acoustic instrument in accordance with claim 19 wherein the slots of the isolator bar are disposed at an angle which is between forty to fifty degrees (40 to 50°) relative to the longitudinal axis.

22. An acoustic instrument in accordance with claim 19 wherein the slots of the isolator bar disposed in said range of angles would represent less than approximately forty percent (40%) of the material of the tubular metal body if said body were without the slots.

23. An acoustic instrument in accordance with claim 19 wherein the slots of the isolator bar disposed in said range of angles would represent approximately twelve to twenty percent (12 to 20%) of the material of the tubular metal body if said body were without the slots.

24. An acoustic instrument in accordance with claim 19 wherein the tubular body of the isolator bar has an outer diameter in the range of approximately 0.75 to approximately 12.0 inches.

25. An acoustic instrument in accordance with claim 19 wherein the slots of the isolator bar are formed of substantially straight lines.

26. An acoustic instrument in accordance with claim 19 wherein the slots of the isolator bar comprise substantially V-shaped cuts in the tubular body.

27. An acoustic instrument in accordance with claim 19 wherein the slots of the isolator bar are formed of substantially curved lines.

28. An acoustic instrument in accordance with claim 19 additionally comprising a γ ray instrument operatively connected to the acoustic instrument.

29. An acoustic instrument in accordance with claim 19 comprising a plurality of acoustic sensors, the isolator bar being connected to the tubular housing of the instrument between the transmitter and all acoustic sensors.

* * * * *